United States Patent [19]

Billeter

[11] 4,291,923

[45] Sep. 29, 1981

[54] EMPTY AND LOAD BRAKE DEVICE

[75] Inventor: Henry R. Billeter, Marco Island, Fla.

[73] Assignee: Sloan Valve Company, Franklin Park, Ill.

[21] Appl. No.: 126,843

[22] Filed: Mar. 3, 1980

[51] Int. Cl.³ .............................................. B60T 8/20
[52] U.S. Cl. .................................... 303/23 R; 303/54
[58] Field of Search ............ 188/195; 303/6 C, 22 A, 303/22 R, 23 A, 23 R, 40, 54

[56] References Cited

U.S. PATENT DOCUMENTS

| 2,362,931 | 11/1944 | Rodway | 303/23 R |
| 4,037,879 | 7/1977 | Horowitz | 303/23 R |
| 4,109,969 | 8/1978 | Reinecke | 303/22 R |

Primary Examiner—Duane A. Reger

Attorney, Agent, or Firm—Kinzer, Plyer, Dorn & McEachran

[57] ABSTRACT

An empty and load brake device for a railroad vehicle air brake system for controlling brake application pressure comprises a housing having an inlet connected to a pressure source and an outlet connected to an air brake cylinder. There is a first passage between the inlet and outlet and valve means for controlling communication through said first passage. A pressure proportional piston controls opening and closing of said first valve means. There is a second passage between said inlet and outlet and second valve means controlling communication through said second passage. A load sensing arm is movably attached to the housing and is in operable engagement with said second valve means for controlling operation thereof.

17 Claims, 3 Drawing Figures

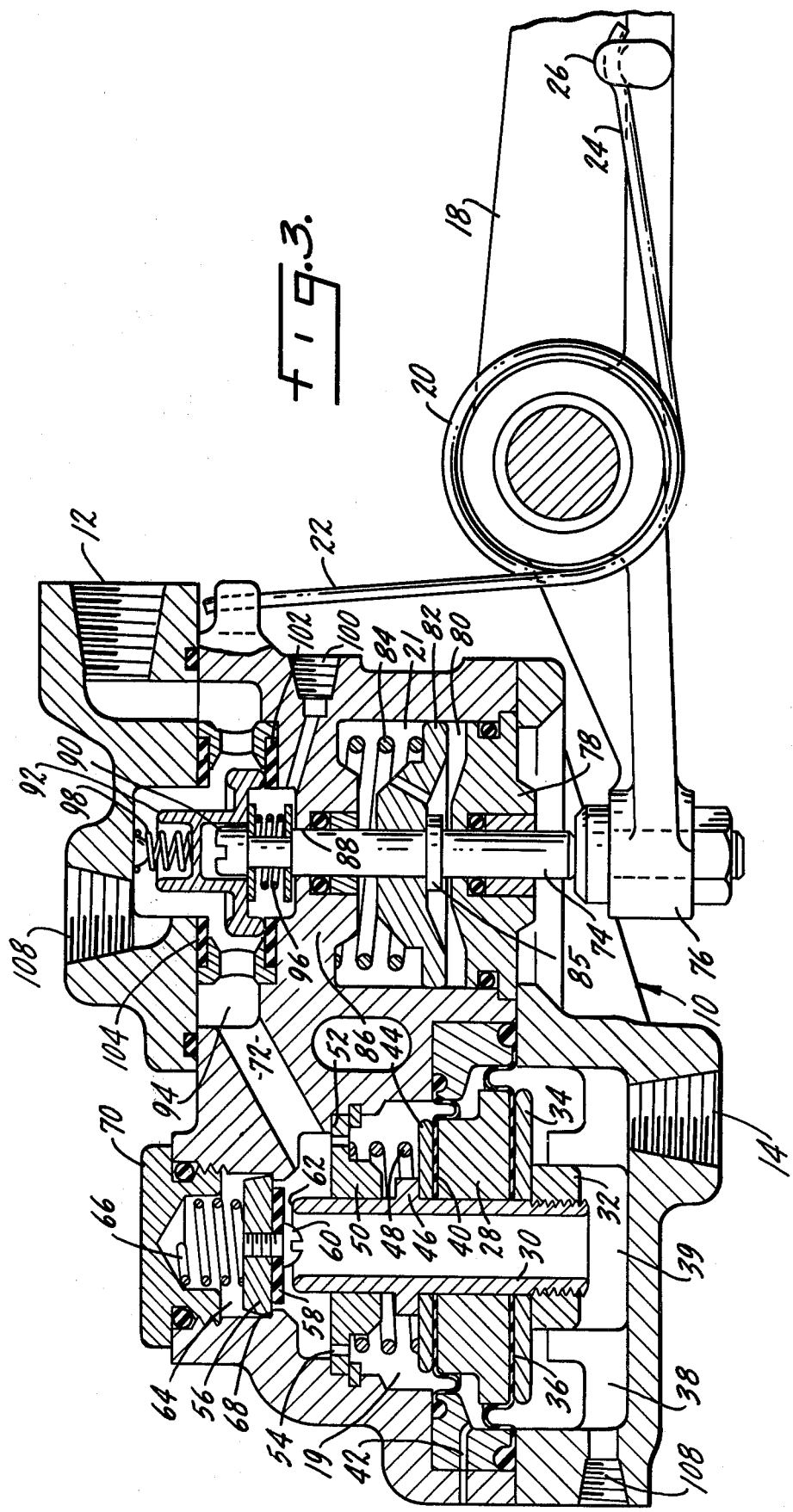

EMPTY AND LOAD BRAKE DEVICE

SUMMARY OF THE INVENTION

The present invention relates to empty and load brake devices for railroad vehicles and in particular relates to such a device in which there are two passages between a pressure source and a brake cylinder, communication through one of said passages being controlled by a pressure proportional piston with communication through the other passage being controlled by a load sensing arm movably attached to the housing.

One purpose of the invention is an empty and load device of the type described which includes dampening means preventing rough track conditions from providing a false indication of car loading.

Another purpose is a device of the type described which uses a pressure proportional piston to control air communication between a pressure source and the brake cylinder when the car is in a lightly loaded or empty condition.

Another purpose is a device of the type described in which a load sensing arm is effective to maintain constant communication between a pressure source and the brake cylinder when the car is in a loaded condition.

Another purpose is a simply constructed reliably operable empty and load brake device of the type described.

Another purpose is an empty and load brake device of the type described which eliminates many of the connections between various elements in a railroad vehicle brake system.

Another purpose is a device of the type described which eliminates the strut cylinder which was formerly mounted on the bolster and had an arm which rode or sensed the position of the side frame relative to the bolster.

Another purpose is an empty and load brake device of the type described having simplified pipe connections between the various elements of a railroad air brake system.

Other purposes will appear in the ensuing specification, drawings and claims.

BRIEF DESCRIPTION OF THE DRAWINGS

The invention is illustrated diagrammatically in the following drawings wherein:

FIG. 3 is an enlarged vertical section through an empty and load device of the type described.

DESCRIPTION OF THE PREFERRED EMBODIMENT

Figure 1:
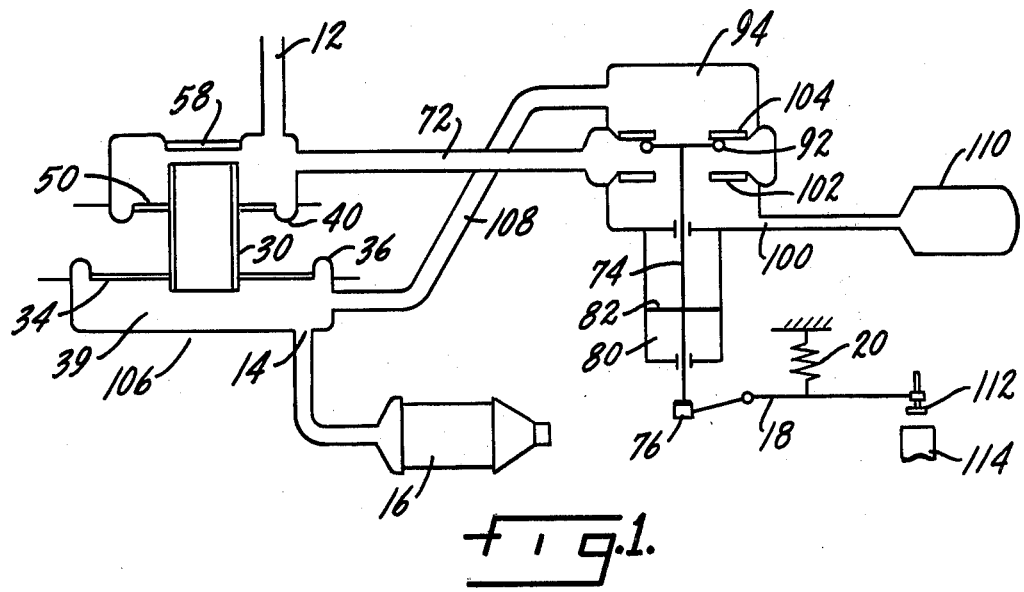
FIG. 1 is a schematic illustration of an empty and load device of the type described showing the valve means in one position.
Figure 2:
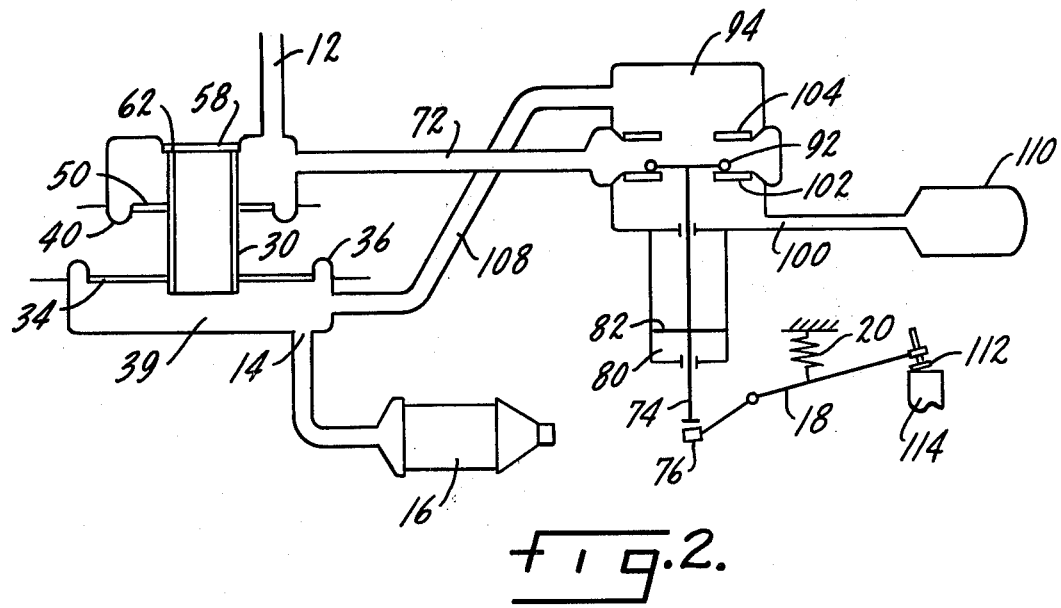
FIG. 2 is a schematic, similar to FIG. 1, but showing the valve means in a second position.

Looking first at FIG. 3, a housing is indicated generally at 10 and has an inlet port 12 and an outlet port 14. As shown in FIGS. 1 and 2, the inlet port 12 will conventionally be connected to a source of brake pressure, for example the conventional ABD valve. Outlet 14 will be connected to a brake cylinder as indicated at 16. Mounted exteriorly of the housing and pivoted thereto is a load sensing arm 18. A coil spring 20 encircles the pivotal connection of arm 18 and has an end 22 positioned against the housing and a further end 24 urged against a stop 26 of the arm 18. Spring 20 will normally urge arm 18 in a clockwise direction. Housing 10 will conventionally be mounted on the car body and the load sensing arm will ride upon the truck side frame when the car is loaded causing arm 18 to be pivoted in a counterclockwise direction against the force of spring 20. The arm will normally clear the side frame when the car is empty and the opposite end will clear a movable valve control rod when the car is loaded.

Within housing 10 there are two separate chambers 19 and 21, at the left and right-hand sides of the housing, respectively. Looking first at the left-hand side chamber 19, a piston 28 is coaxially mounted to a sleeve 30. The lower end of sleeve 30 threadedly mounts a nut 32 which holds a plate 34 to the bottom of the piston.

A rolling diaphragm 36 is clamped between the plate and piston with the plate holding the diaphragm to the piston. The outer periphery of diaphragm 36 will conventionally be held between portions of housing 10. The space beneath piston 28, which space is in communication with port 14, may have a series of guide ribs 38 which are effective to maintain alignment of the piston and sleeve as it reciprocates within its chamber. Normally, the pressure beneath the piston 28, which is the pressure in the brake cylinder, will urge the piston in an upward direction.

A second rolling diaphragm 40 is mounted on the upper side of piston 28, again with the periphery of the diaphragm being held by portions of the housing. The space between the two rolling diaphragms forms a small chamber which is vented to atmosphere through a passage 42. Positioned on top of rolling diaphragm 40 is a plate 44 which is held in position by an outwardly-extending annular shoulder 46 on sleeve 30. A coil spring 48 is positioned between plate 44 and guide member 50 and exerts a downwardly-directed bias upon plate 44. In the position shown in FIG. 3, the upper side of member 50 is positioned against a shoulder 52 formed in the housing. Member 50 has air passages 54 which place the upper side of the member in communication with the chamber beneath it and thus with the upper side of piston 28.

At the upper end of left-hand chamber 19 there is a valve member 56 having a seal 58 held thereto by a screw 60. Seal 58 is coaxial with sleeve 30 and the upper rounded end 62 of the sleeve is positioned for engagement with the seal. The seal reciprocates within a chamber 64 containing a spring 66 which conventionally will urge the seal down upon a movement limiting shoulder 68. A threaded cap 70 mounted in the housing is provided for assembly and replacement of valve 58.

Air pressure available at inlet 12, from a pressure source such as the ABD valve will be in communication with the upper side of member 50 through a connecting passage 72, only a portion of which is shown, with such pressure being applied through opening 54 to the top of piston 28. In like manner, when the mechanism is in the position shown, such air pressure will pass down through the sleeve to the area beneath piston 28 and to the brake cylinder through port 14 and suitable connections.

A rod 74 is movable in right-hand chamber 21 and the lower end of the rod is adapted for contact with the inward end 76 of load sensing arm 18. A cylinder head 78 is provided to close the bottom of a damping chamber 80. A piston 82 is fixed on rod 74 and is movable within the damping chamber as will be described in more detail hereinafter. A coil spring 84 is bottomed upon piston 82 and has its upper coil seated against a portion 86 of the housing. Rod 74 extends through an opening 88 and has a head 90 mounted thereupon. Head 90 extends upwardly into a valve member 92 reciprocal within a chamber 94. A coil spring 96 is positioned beneath valve member 92 and is in contact with a washer 91 to thereby urge the valve member in an upward direction. An additional weaker coil spring 98 is positioned above the valve member and will urge the valve member in a downward direction. The right-hand side of passage 72 opens into chamber 94. A passage 100 extends from the right side of chamber 94. Passages 72 and 100 will be in communication with each other when valve member 92 is in an upward position. Communication between these passages will be closed when the valve member is in the position shown in FIG. 3. There are two valve seats in chamber 94 which cooperate with valve member 92, lower seat 102 and an upper seat 104. Head 90 and washer 91 under valve 92 limit the action of spring 96. Spring 98 is weaker than spring 96. Thus, valve 92 has a definite axial relationship to rod 74 when it is not in contact with either seat 104 or seat 102. Washer 91 leaving valve 92 on compression of spring 96 provides for overtravel of rod 74 after valve 92 is seated upon either seat.

Looking at FIGS. 1 and 2, the left-hand portion of the empty and load device is indicated generally at 106. Chamber 39 which is positioned beneath piston 28 and in communication with outlet 14, is in turn in communication with chamber 94 through a passage 108. Passage 108 may either be a passage external to the housing or it may be formed by a bore within the housing. Passage 100 is in communication with a reservoir 110. In addition, load sensing arm 18 is diagrammatically illustrated as having an adjustable screw 112 which is positioned to make contact with side frame 114 of a railroad car. FIGS. 1 and 2 are specifically designed to illustrate the operation of the empty and load device and schematically or diagrammatically illustrate the valve shown in detail in FIG. 3.

APPLICATION OF THE BRAKES ON A LOADED VEHICLE

FIG. 2 illustrates the position of the valve structure when the railroad car is fully loaded. Load sensing arm 18 has been pivoted by the car side frame to assume a position in which rod 74 drops down under the influence of spring 84. A shoulder 85 limits downward movement of the rod. Valve member 92 is seated upon seal 102 by spring 98 and communication between passages 72 and 100 is closed. No air can thus pass to reservoir 110. The normal passage of air from inlet 12 to outlet 14 is into passage 72 and then on to the upper side of member 50. Air will flow down the center of sleeve 30 into chamber 39 and then out of port 14. Piston 28 is a pressure proportioning valve. Whenever the pressure in chamber 39 exceeds 60 percent of the pressure in the chamber above member 50, piston 28 will move upward, against the action of spring 48, so that the upper end 62 of the sleeve will close upon seal 58. This will cut off communication between inlet 12 and outlet 14 in the manner described. Assuming a fully loaded vehicle, the sleeve will have been moved to a position closing upon seal 58.

There is direct communication between the inlet (ABD valve) and the outlet (brake cylinder) by means of passage 108. Air will flow downwardly from the inlet into passage 72 and then to the right into chamber 94 above the seal member 92 which has been closed in its lower position by action of the load sensing arm. From chamber 94 air will flow directly through passage 108 into chamber 39 and then through the outlet to the brake cylinder. Thus, whenever there is a loaded car the pressure proportioning portion of the mechanism does not control as the air is passed directly to the air cylinder around valve member 92.

APPLICATION OF THE BRAKES ON AN EMPTY VEHICLE

FIG. 1 illustrates the position of the mechanism when the brakes are applied on an empty or lightly loaded vehicle. Load sensing arm 18 pivots in a clockwise direction urging rod 74 upward causing valve member 92 to close upon its upper seat 104, thus closing communication with passage 108. The pressure proportioning piston will function to control the amount of air passed to the brake cylinder. As indicated above, whenever the pressure in chamber 39 exceeds 60 percent of the pressure in the chamber above member 50, the piston will move upwardly carrying with it sleeve 30. The 60 percent figure is only by way of illustration as it is likely that the actual figure will be determined by the type of car and the loading that will be upon it.

The described 60/40 pressure ratio is only effective after the pressure of spring 48 is overcome. The spring permits an amount of pressure in the brake cylinder to overcome the return spring and allow the piston to move forward. Additional pressure, proportionally reduced in the above ratio, is effective to apply the brakes. When the car is lightly loaded or unloaded the effect of the pressure proportioning piston will be modulation movement of sleeve 30. As the pressure beneath the pressure proportioning piston rises the sleeve will close as described and when the pressure drops the sleeve will drop. Thus, the amount of pressure passing through the sleeve to outlet 14 is determined by the pressure within chamber 39 which causes the sleeve and its associated piston to rise.

When the device is in the position of FIG. 1, passage 72 is in communication with passage 100 and thus with reservoir 110 as valve member 92 is in the upper position diagrammatically illustrated in the drawing. To compensate for reduction in air consumption when the car is operating in an empty condition, reservoir 110 provides a space to accomodate the additional air not used in brake applications. The quantity of air available from the pressure source is the same under both empty and loaded conditions. However, since the pressure is lower under an empty condition, reservoir 110 provides the needed additional volume to accomodate such air. At the end of the brake application, air in the reservoir will flow back through the same passage means described above.

Dampening piston 82 is important as it prevents movement of rod 74 caused by rough track conditions from actually providing a false indication of the loading on a car. Chamber 80 is filled with fluid and piston 82 is normally urged in a downward direction by spring 84, and in an upward direction by spring 20.

The force of spring 84 is equal to one half of the force of spring 20. Thus, the spring force in an upward direction when the load sensing arm is not in contact with the side frame is equal to the downward spring force when the load sensing arm is in contact with the side frame. The equal and opposite spring forces upon dash pot piston 82 permit it to have the same regulatory effect on movement of rod 74 whether the car is empty or loaded.

Since housing 10 is mounted upon the car body, all connections with the air brake system can be made with pipe, eliminating unsatisfactory hose connections. Prior empty and load devices using the so-called strut cylinder which was mounted on the bolster with a sensing arm for the side frame required flexible connections.

Whereas the preferred form of the invention has been shown and described herein, it should be realized that there may be many modifications, substitutions and alterations thereto.

The embodiments of the invention in which an exclusive property or privilege is claimed are defined as follows:

1. An empty and load device for a railroad vehicle air brake system for controlling brake application pressure comprising, housing means having an inlet connected to a pressure source and an outlet connected to an air brake cylinder, a first passage between said inlet and outlet, valve means controlling communication through said first passage, pressure proportional piston means controlling opening and closing of said valve means, a second passage between said inlet and outlet, second valve means controlling communication through said second passage, and a load sensing arm movably attached to said housing means for controlling operation of said second valve means.

2. The device of claim 1 further characterized by and including spring means normally urging said second valve means toward a passage opening position, spring means urging said load sensing arm toward a position to effect movement of said second valve means toward a closing position.

3. The structure of claim 2 further characterized by and including a rod positioned for contact with said load sensing arm and extending to said second valve means, and means for dampening movement of said rod to prevent rough track conditions from simulating a loaded or unloaded vehicle.

4. The device of claim 3 further characterized in that said dampening means includes a fluid dampened piston movable in said housing and connected to said rod, and spring means positioned to act upon said fluid dampened piston in a direction contrary to movement thereof caused by said load sensing arm.

5. The device of claim 4 further characterized in that the spring means acting on said load sensing arm provides twice the force as the spring means acting on said fluid dampened piston whereby providing generally equal and opposite spring forces on said fluid dampened piston.

6. The device of claim 4 further characterized in that said fluid dampened piston is coaxially mounted upon said rod.

7. The device of claim 1 further characterized in that said pressure proportional piston means includes a first piston surface movable in a chamber communicating with said outlet port and second piston surface movable within a chamber connected to said inlet port, said second piston surface having a predetermined area relationship relative to said first piston surface.

8. The device of claim 7 further characterized by and including spring means operable upon said second piston surface.

9. The device of claim 7 further characterized in that said pressure proportional piston means includes a sleeve, with the interior of said sleeve forming a portion of said first passage, and with said first valve means being positioned at one end of said sleeve.

10. The device of claim 1 further characterized by and including a reservoir connected to one side of said second valve means, said second valve means having a first position opening said second passage between said inlet and outlet and a second position connecting said reservoir with said inlet.

11. The device of claim 10 further characterized in that said second valve means closes said second passage in said second position.

12. In an empty and load brake device for a railroad vehicle air brake system for controlling brake application pressure comprising:

a housing having an inlet connected to a pressure source and an outlet connected to an air brake cylinder, a load sensing arm pivotally connected at one end to said housing, a first and a second piston arranged in adjacent parallel relationship in said housing for controlling communication between said inlet and said outlet, linkage means extending between the second of said pistons and said load sensing arm, a pair of air passages between said inlet and outlet, one of said passages being connected between the top of said second piston and to the bottom of said first piston, the other of said passages connected between the bottom of said first piston and the top of said first piston, valve members associated with said pistons for controlling said air passages, a compensating air reservoir, and an air passage connected between the bottom of said second piston and said compensating air reservoir.

13. The empty and load sensing device of claim 11 further characterized in that said second piston is provided with a valve member movable by said second piston for controlling the air passage connection at the top end of said second piston in one position of said second piston and movable by said second piston for controlling the air passage connection at the bottom end of said second piston in another position of said second piston.

14. The empty and load sensing device of claim 10 further characterized in that said second piston is spring-biased to close the valve member against the lower air passage in one position and movable by said sensing arm to close the upper air passage in another position of said sensing arm.

15. The empty and load sensing device of claim 10 further characterized in that said second piston is movable in one chamber of said housing and said valve member movable in another chamber of said housing.

16. The empty and load sensing device of claim 12 further characterized in that said second piston is located in one chamber of said housing and said valve member in another separate chamber of said housing, there being a connecting rod between said piston and said valve member.

17. The empty and load sensing device of claim 12 further characterized in that said second piston is located in one chamber of said housing and said valve member in another chamber of said housing, said second piston and said valve member being connected together by an operating rod extending through a wall of said housing, said operating rod extending at one end through said housing and being in operative relationship to said sensing arm.

* * * * *